United States Patent [19]
Mukoyama et al.

[11] 4,294,952
[45] Oct. 13, 1981

[54] POLYAMIDE-IMIDE RESIN AND ITS PRODUCTION

[75] Inventors: Yoshiyuki Mukoyama, Hitachi; Touichi Sakata, Katsuta, both of Japan

[73] Assignee: Hitachi Chemical Company, Ltd., Tokyo, Japan

[21] Appl. No.: 94,938

[22] Filed: Nov. 16, 1979

[30] Foreign Application Priority Data

Nov. 30, 1978 [JP] Japan ................................ 53-148820
Dec. 28, 1978 [JP] Japan ................................ 53-164753
Mar. 22, 1979 [JP] Japan ................................ 54-33921

[51] Int. Cl.$^3$ ...................... C08G 18/73; C08G 18/74; C08G 18/75; C08G 18/76
[52] U.S. Cl. ............................ 528/67; 260/32.6 NA; 260/33.4 P; 428/458; 428/425.8; 428/473.5; 528/73; 174/110 SR
[58] Field of Search ..................................... 528/67, 73

[56] References Cited

U.S. PATENT DOCUMENTS

| | | | |
|---|---|---|---|
| 3,658,773 | 4/1972 | Zecher et al. | 528/67 |
| 3,763,269 | 10/1973 | Formaini | 528/67 |
| 3,790,530 | 2/1974 | Koerner et al. | 528/67 |
| 3,884,880 | 5/1975 | Disque et al. | 528/67 |
| 3,937,673 | 2/1976 | Koerner et al. | 528/67 |
| 3,952,084 | 4/1976 | Edelman et al. | 528/67 |
| 4,094,864 | 6/1978 | Onder | 528/67 |
| 4,094,866 | 6/1978 | Onder | 528/67 |

*Primary Examiner*—Howard E. Schain
*Attorney, Agent, or Firm*—Craig and Antonelli

[57] ABSTRACT

A polyamide-imide resin obtained by reacting in a cresol type solvent a polyisocyanate containing isocyanurate rings, an aromatic diisocyanate, a lactam and a polycarboxylic acid containing at least one acid anhydride group, said polyisocyanate being used in an amount of 1 to 30 equivalent % and said lactam in an amount of 20 to 80 equivalent % each based on the total isocyanate equivalent can give a resin composition or a varnish suitable for coating, particularly for producing insulated wire excellent in heat resistance, flexibility, resistance to Freon, wear resistance, and the like.

16 Claims, 1 Drawing Figure

U.S. Patent
Oct. 13, 1981
4,294,952
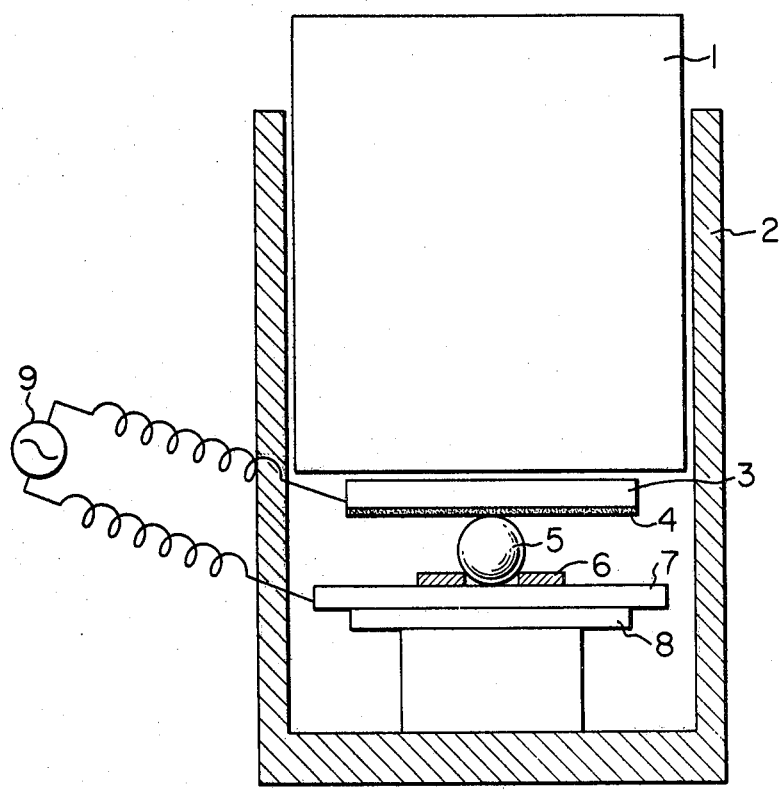

POLYAMIDE-IMIDE RESIN AND ITS PRODUCTION

This invention relates to a polyamide-imide resin, a process for producing the same, a resin composition containing the same and electrical conductor having an insulating coating such as insulated wire coated with the same.

Polyester type varnishes are presently widely used as electrical insulating varnishes, particularly as varnishes for enamelled wire, since they have balanced properties in mechanical properties, electrical properties, heat resistance and the like.

But recent tendency of miniaturization and weight-saving of electrical equipments requires varnishes for enamelled wire having good heat resistance and excellent resistance to Freon. As to varnishes for enamelled wire good in heat resistance and resistance to Freon, there are known varnishes having high heat resistance such as polyimide varnishes, polyamide-imide varnishes, and the like. But these varnishes have many problems in that they are only soluble in special solvents such as N-methylpyrrolidone (NMP), the resins themselves are expensive, and the like. In order to improve heat resistance of polyester type varnishes for enamelled wire, there have been proposed polyester-imide varnishes containing imide groups in some portions of the resin component. Polyester-imides are improved in heat resistance comparing with polyesters but have defects in heat softening properties and resistance to Freon, and thus they are inferior to polyamide-imides.

There have been made various studies on making polyamide-imide varnishes which are excellent in heat resistance and soluble in a general-purpose solvent such as cresol, and the like (e.g. Japenese Patent Application Kokoku (Post-Exam Publn) Nos. 30718/74 and 20993/75). But there have not been produced such resins as having balanced properties in heat resistance, resistance to Freon, mechanical properties, electrical properties, etc.

On the other hand, as insulated wire, that coated with a polyester type resin as an electrical insulating coating composition is widely used since it has comparatively balanced properties in mechanical properties, electrical properties, heat resistance, and the like. As insulated wire good in heat resistance, resistance to Freon, and wear resistance, there is used one coated with a composition of polyimide, polyamide-imide or the like and having high heat resistance. But the resin composition used for coating has many problems in that it is only soluble in special solvents such as N-methylpyrrolidone (NMP), the resin itself is expensive and there is an economical problem of using it. It order to solve such problems, there is proposed insulated wire coated with so-called tris(2-hydroxyethyl) isocyanurate (THEIC) modified polyesterimide containing imide groups and obtained by using THEIC. But THEIC modified polyesterimide is remarkably improved in heat resistance comparing with polyesters but has defects in wear resistance and resistance to Freon, so that it is inferior to polyamide-imides.

It is an object of this invention to provide a polyamide-imide resin having balanced properties in heat resistance, resistance to Freon, mechanical properties such as flexibility, wear resistance, etc., electrical properties, and the like and being usable in a cresol type solvent. It is another object of this invention to provide a process for producing such a polyamide-imide resin. It is a further object of this invention to provide a resin composition containing such a polyamide-imide resin as a base component. It is a still further object of this invention to provide an electrical conductor having an insulating coating consisting essentially of such a polyamide-imide resin.

This invention provides a polyamide-imide resin obtained by reacting in a cresol type solvent a polyisocyanate containing isocyanurate rings, an aromatic diisocyanate, a lactam and a polycarboxylic acid containing at least one acid anhydride group, said polyisocyanate being used in an amount of 1 to 30 equivalent % based on the total isocyante equivalent and said lactam being used in an amount of 20 to 80 equivalent % based on the total isocyanate equivalent. This invention also provides a process for producing the polyamide-imide resin and a resin composition containing the polyamide-imide resin. This invention further provides an electrical conductor such as insulated wire having an insulating coating consisting essentially of the polyamide-imide resin mentioned above.

The attached drawing is a schematic drawing of an apparatus for measuring a heat softening temperature.

The polyisocyanate containing isocyanurate rings can be obtained, for example, by trimerization of a polyisocyanate compound. This reaction can be carried out in a solvent which does not react with the isocyanate group. In order to conduct the reaction effectively, it is desirable to use a catalyst for trimerization of polyisocyanate compounds. The product is a polyisocyanate containing isocyanurate rings, said polyisocyanate being a non-masked material. As the solvent, any ones which can dissolve the polyisocyanate compounds can be used. Examples of the solvents are aliphatic and aromatic hydrocarbons, halogenated aromatic hydrocarbons, esters, ketones, ethers, ethylene glycol monoalkyl monoacetates, dimethylsulfoxide, and the like.

Examples of the catalysts for trimerization of polyisocyanate compounds are alkali metal acetates, metal salts of iron, magnesium, nickel, zinc, tin, lead, vanadium, titanium, etc., organometallic compounds such as titanium tetrabutoxide, N-methyl morpholine, 1,8-diazabicyclo(5,4,0)undecene-7, Mannich bases of phenol such as 2-(dimethylaminomethyl)-4,6-dimethylphenol, etc., tertiary amines such as N,N-bis-(dimethylaminoethyl)-N-methylamine, 2-dimethylaminoethanol, etc., and organic carboxylates of tertiary amines.

The trimerization of the polyisocyanate compound can be carried out, for example, at a temperature of 50° to 160° C.

Practical trimerization of polyisocyanate compound is very complicated and an isocyanate adduct containing only one isocyanurate ring in a molecule is not always obtained selectively. In addition, there is also obtained a mixture containing unreacted polyisocyanate and isocyanate adducts containing two or more isocyanurate rings in a molecule. In this invention, such a mixture can also be used. The amount of the catalyst and the reaction temperature can be determined depending on the number of isocyanurate rings contained in the isocyanate adducts. For example, in the case of conducting the reaction so that the proportion of remaining isocyanate groups becomes about 50%, 0.01 to 2% by weight of a tertiary amine based on the weight of the starting polyisocyanate and a reaction temperature of 70° to 150° C. are preferably employed.

As the starting polyisocyanate for producing the polyisocyanate containing isocyanurate rings, any diisocyanate compounds which can form isocyanurate rings can be used either aliphatic, alicyclic or aromatic. Taking heat resistance, solubility and production cost into consideration, preferable examples are aromatic diisocyanates, particularly 4,4'-diphenylmethane diisocyanate, tolylene diisocyanate, xylylene diisocyanate, 4,4'-diphenylether diisocyanate, and the like. These compounds may be used alone or as a mixture of two or more of them.

The polyisocyanates containing isocyanurate rings can be used alone or as a mixture of two or more of them. It is also possible to use one or more polyisocyanates previously synthesized or one or more polyisocyanates containing isocyanurate rings stabilized by blocking agents such as phenol, cresol, etc. after the synthesis in order to prevent changes with the lapse of time. The number of isocyanurate ring in the polyisocyanate containing isocyanurate rings may be changed depending on the uses, but the content of remaining isocyanate group is preferably in the range of 10 to 70% (taking the content of isocyanate group in the starting diisocyanate 100%). If the content is too much, flexibility is lowered, while too little, heat resistance is lowered.

The amount of the polyisocyanate containing isocyanurate rings to be used is very important in this invention as well as that of the lactam mentioned below. The polyisocyanate containing isocyanurate rings should be used in an amount of 1 to 30 equivalent % based on the total isocyanate equivalent. If the amount is outside the above-mentioned range, properties balanced in heat resistance and flexibility cannnot be obtained. Further, if the amount is too much, gelation may take place during the synthesis due to enhanced degree of branching.

As the lactams which are important starting materials for solubilizing the final product in a cresol type solvent as well as the polyisocyanate containing isocyanurate rings, any ones which can react with isocyanate groups and/or acid anhydride groups in a cresol type solvent and are soluble in the solvent may be used. Examples of the lactams are ε-caprolactam, dodecyl lactam, etc. These lactams can be used alone or as a mixture thereof. Among them, ε-caprolactam is preferable taking solubility, reactivity and production cost into consideration.

It is not necessary to use the lactam in equivalent amount to the isocyanate group (taking ε-caprolactam as bifunctional, i.e. 1 mole is equal to 2 equivalents). There is no guarantee that use of a large amount of lactam make the lactam effectively taken into the skelton of the produced resin. The lactam is used in an amount of 20 to 80 equivalent % based on the total isocyanate equivalent taking heat resistance, flexibility, and solubility into consideration totally and making the lactam substantially taken into the resin. If the amount is outside the above-mentioned range, there is obtained no polyamide-imide resin soluble in a cresol type solvent and having properties balanced in heat resistance and flexibility and excellent in resistance to Freon, wear resistance, etc.

As the aromatic diisocyanates, there can preferaby be used 4,4'-diphenylmethane diisocyanate, 4,4'-diphenylether diisocyanate, tolylene diisocyanate, xylylene diisocyanate, etc. These diisocyanates can be used alone or as a mixture of two or more of them.

As the polycarboxylic acids containing at least one acid anhydride group, there can be used any carboxylic acids containing an acid anhydride group which reacts with isocyanate groups and their derivatives such as represented by the following formulae:

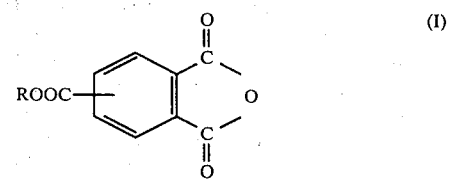 (I)

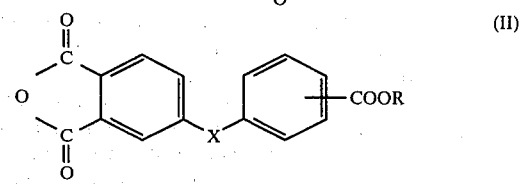 (II)

wherein R is hydrogen, alkyl having preferably 1 to 8 carbon atoms, or phenyl; and X is —$CH_2$—, —CO—, —$SO_2$—, or —O—, for example, trimellitic anhydride, etc. If necessary, a portion of the polycarboxylic acid containing at least one acid anhydride group may be replaced by at least one carboxylic acid dianhydride such as pyromellitic dianhydride, benzophenonetetracarboxylic dianhydride, butanetetracarboxylic dianhydride, bicyclo-[2,2,2]-oct-(7)-ene-2:3, 5:6-tetracarboxylic dianhydride and their derivatives and/or at least one aliphatic or aromatic dibasic acid such as adipic acid, sebacic acid, etc. Among them, trimellitic anhydride, is preferable taking heat resistance and production cost into consideration.

The amounts of the isocyanate component and the acid component to be used are preferably in the range of 1.5 to 0.71/1 in terms of a ratio of the carboxyl group and the acid anhydride group to the isocyanate group. Particularly, in order to obtain a resin having high molecular weight which is preferable from the viewpoint of properties of insulated wire, the ratio of about 1/1 is most preferable.

The reaction for producing the desired polyamide-imide resin can be carried out by charging all the starting materials at the same time and conducting the reaction at a temperature of about 160° to 230° C. A preferable process is to charge all the isocyanate components, the lactam, and the cresol type solvent into a reactor, to react at a temperature of 160° to 190° C. for 1 to 3 hours, to add the polycarboxylic acid containing at least one acid anhydride group to the reactor, and to continue the reaction at a temperature of 200° to 230° C. for 3 to 20 hours. The progress of the reaction can be controlled by measuring bubbles of carbon dioxide gas generated during the reaction and a viscosity of the reaction solution. In order to prevent changes with the lapse of time and to conduct the reaction uniformly, it is effective to dissolve the isocyanate component in the cresol type solvent previously. In order to conduct the reaction sufficiently, it is preferable to use a catalyst of organometallic salts such as tin octoate, cobalt octoate, etc. and tertiary amines conventionally used in the art.

As the cresol type solvent, there can be used cresol, phenol, xylenol, etc. These solvent may be used alone or a mixture thereof. As a portion of a mixture of solvents, there can be used high-boiling point aromatic organic solvents such as xylene, NISSEKI HISOL-100 and 150 (trade names of aromatic hydrocarbons manufactured by Nippon Petrochemicals Co., Ltd.), Cellosolve Acetate, and the like.

The thus obtained polyamide-imide resin and its composition can be used, for example, as varnishes by diluting it with a solvent such as a polar solvent, e.g. a cresol type solvent mentioned above, NMP, dimethylformamide, dimethylacetamide, or the like to a resin content of 20 to 40% by weight. In such a case, there may be used as auxiliary solvent xylene, NISSEKI HISOL-100, Cellosolve Acetate, and the like, and if necessary, the varnish may further contain a small portion of one or more other resins soluble in a cresol type solvent such as phenol-formaldehyde resins, epoxy resins, alkylated methylol-melamine resins, polyester resins, and the like. These resins may be used alone or as a mixture thereof. These resins may be used in an amount of 0.5 to 15% by weight based on the weight of the polyamide-imide resins. In order to improve properties of the polyamide-imide resins, there can be used organometallic compounds such as zinc octoate.

The coating film obtained by using such a composition or varnish prepared as mentioned above is good in heat resistance, resistance to Freon, flexibility and can be used sufficiently in practical applications.

Further, electrical conductors having electrical insulating coating thereon such as insulated wire produced by using the polyamide-imide resin of this invention in a conventional manner show good heat resistance, resistance to Freon, wear resistance and flexibility.

This invention is illustrated by way of the following examples.

COMPARATIVE EXAMPLE 1

(1) Synthesis of a polyisocyanate containing isocyanurate rings.

| Ingredients | Grams |
| --- | --- |
| Tolylene diisocyanate | 600 |
| Xylene | 600 |
| 2-Dimethylaminoethanol | 1.8 |

The above-mentioned ingredients were placed in a four-necked flask equipped with a thermometer and a stirrer and heated to 140° C. under nitrogen stream. The reaction was conducted at that temperature until the isocyanate group content became 25% by weight (the initial concentration 48% by weight). The product (diisocyanate timer) showed the absorption of isocyanurate ring at 1710 cm$^{-1}$ and 1410 cm$^{-1}$ and the absorption of isocyanate group at 2260 cm$^{-1}$ in the infrared spectra.

(2) Synthesis of polyamide-imide resin soluble in cresol.

| Ingredients | Grams | Equivalent |
| --- | --- | --- |
| Polyisocyanate synthesized in above (1) (a 50% solution) | 37.0 | 0.11 |
| 4,4'-Diphenylmethane diisocyanate | 113.3 | 0.91 |
| Trimellitic anhydride | 96.0 | 1.00 |
| ε-Caprolactam | 63.0 | 1.12 |
| Cresol | 220 | |

The above-mentioned ingredients except for trimellitic anhydride were placed in a four-necked flask equipped with a thermometer, a stirrer and a fractional distillation tube and heated to 180° C. under nitrogen stream to conduct the reaction at that temperature for 90 minutes. Subsequently, trimellitic anhydride was added to the flask and the temperature was raised to 210° C. The reaction was conducted at 210°–220° C. for about 15 hours. The resin concentration was adjusted to 30% by weight with cresol to give a varnish. The resulting solution had a viscosity of 270 poises. A methanol insoluble portion of the resin has a reduced viscosity ($\eta_{sp/c}$) of 0.20 measured in dimethylformamide. Infrared spectra of the resin showed the absorption of imide group at 1780 cm$^{-1}$ and the absorption of amide group at 1650 cm$^{-1}$.

COMPARATIVE EXAMPLE 2

Tris(2-hydroxyethyl)isocyanurate modified polyester-imide varnish (trade name ISOMID, manufactured by Schenectady Chemicals Inc.) was used.

EXAMPLE 1

| Ingredients | Grams | Equivalent |
| --- | --- | --- |
| Polyisocyanate synthesized in Comparative Example 1 (1) (a 50% solution) | 37.0 | 0.11 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 200 | |

The above-mentioned ingredients were reacted in the same manner as described in Comparative Example 1 (2) to give a varnish of resin concentration of 30% by weight adjusted with cresol. The resulting solution had a viscosity of 300 poises. The reduced viscosity ($\eta_{sp/c}$) measured in the same manner as described in Comparative Example 1 (2) was 0.24. Infrared spectra of the resin showed the absorption of imide group at 1780 cm$^{-1}$ and the absorption of amide group at 1650 cm$^{-1}$.

EXAMPLE 2

| Ingredients | Grams | Equivalent |
| --- | --- | --- |
| Polyisocyanate synthesized in Comparative Example 1 (1) (a 50% solution) | 57.0 | 0.17 |
| 4,4'-Diphenylmethane diisocyanate | 105.8 | 0.85 |
| Trimellitic anhydride | 96.0 | 1.00 |
| ε-Caprolactam | 39.4 | 0.70 |
| Cresol | 350 | |

The above-mentioned ingredients were reacted in the same manner as described in Comparative Example 1 (2) to give a varnish of resin concentration of 30% by weight adjusted with cresol. The resulting solution had a viscosity of 310 poises. The reduced viscosity ($\eta_{sp/c}$) measured in the same manner as described in Comparative Example 1 (2) was 0.23. Infrared spectra of the resin showed the absorption of imide group at 1780 cm$^{-1}$ and the absorption of amide group at 1650 cm$^{-1}$.

EXAMPLE 3

| Ingredients | Grams | Equivalent |
| --- | --- | --- |
| Polyisocyanate synthesized in Comparative Example 1 (1) (a 50% solution) | 26.8 | 0.08 |
| 4,4'-Diphenylmethane | 117.0 | 0.94 |

-continued

| Ingredients | Grams | Equivalent |
| --- | --- | --- |
| diisocyanate | | |
| Trimellitic anhydride | 96.0 | 1.00 |
| ε-Caprolactam | 28.1 | 0.50 |
| Cresol | 200 | |

The above-mentioned ingredients were reacted in the same manner as described in Comparative Example 1 (2) to give a varnish of resin concentration of 30% by weight adjusted with cresol. The resulting solution had a viscosity of 300 poises. The reduced viscosity ($\eta_{sp/c}$) measured in the same manner as described in Comparative Example 1 (2) was 0.24. Infrared spectra of the resin showed the absorption of imide group at 1780 $cm^{-1}$ and the absorption of amide group at 1650 $cm^{-1}$.

Properties of cured coating film obtained by using these varnishes were tested and listed in Table 1.

TABLE 1

| Example No. | Comparative Example 1 | Comparative Example 2 | Example 1 | Example 2 | Example 3 |
| --- | --- | --- | --- | --- | --- |
| Properties of coating film | | | | | |
| Heat softening temp. (load 2 kg) | 325° C. | 385° C. | 370° C. | 390° C. | 380° C. |
| Erichsen test | 35 mm | 50 mm | 80 mm | 75 mm | 70 mm |
| Resistance to Freon | Δ | Δ ~ x | o | o | o |

Note
o : good
Δ : slightly bad
x : bad

Test methods employed in the above examples are as follows.

(i) Heat softening temperature

One surface of a bonderized steel plate (0.775 mm thick) was polished with a sand paper (400 CW) and coated with a varnish in 0.325 mm thickness. The varnish was baked in a hot-air flowing type dryer at 250° C. for 30 minutes to give a coated plate. The coated plate was placed in an apparatus shown in the attached drawing to measure a heat softening temperature. In the drawing, numeral 1 denotes a load (2 kg), numeral 2 denotes supporting metallic parts, numeral 3 denotes a sample (a coated plate 0.775 mm thick), numeral 4 denotes the coated surface, numeral 5 denotes a steel ball (diameter 5 mm), numeral 6 denotes washer, numeral 7 denotes a steel plate (0.8 mm thick), numeral 8 denotes an insulating plate (glass cloth) and numeral 9 denotes an alternating electric current source (100 V).

(ii) Erichsen test

The same coated plate as prepared in above item (i) was used in the test according to JIS B 7777. The greater value shows better flexibility.

(iii) Resistance to Freon

The same coated plate as prepared in above item (i) was cut to give a test plate of 20 mm × 150 mm. The test plate was subjected to preliminary heating to remove water (at 120° C. for 1 hour). Subsequently, the test plate and freezer oil (RM-25F) were placed in an autoclave and closed. The contents of the autoclave were heated to 100° C. while defoaming under reduced pressure (about 10 mm Hg). After maintaining at that temperature for 30 minutes, the autoclave was cooled to room temperature and Freon gas (R-22) was introduced in the autoclave. The contents of the autoclave were heated to 125° C. and maintained at that temperature for 7 days to continue the treatment. Then the autoclave was cooled gradually to room temperature and the Freon gas was removed gently. Immediately after removing the Freon gas, the oil adhered to the sample was wiped off and the sample was subjected to heat treatment at 130° C. for 10 minutes. The thus treated sample was subjected to various tests, i.e. observation of appearance (good: no blister), insulation breakdown voltage (good: 9 kV or more) and pencil hardness (good: 6H or harder), and these properties were judged totally by using marks o (good), Δ (slightly bad) and x (bad).

(iv) Reduced viscosity (a) Methanol insoluble portion

A resin solution obtained by diluting 15 g of a varnish with 20 g of chloroform was added dropwise to 150 ml of a methanol solvent with stirring to deposit insoluble material. The resulting mixture was filtered by using a filter paper No. 131 under reduced pressure to give a residue of filtration.

(b) Measuring of $\eta_{sp/c}$

The residue of filtration obtained as mentioned above, which is the methanol insoluble portion, was dried under reduced pressure of 2 mm Hg at 80° C. for 4 hours. Dried powder was weighed precisely in an amount of 0.50 g and dissolved in dimethylformamide (DMF) to give a 100 ml solution. 10 Ml of solution was taken out of the thus prepared DMF solution and a viscosity at 30° C. was measured by using an Ostwald viscometer (flow down time, $t_s$). Reduced viscosity was calculated from the following equation:

$$\eta_{sp/c} = \frac{t_s - t_{DMF}}{t_{DMF} \times 0.50}$$

wherein $t_{DMF}$ is a flow down time of DMF itself.

As is clear from the results of Table 1, individual samples obtained in Examples 1 to 3 produced from specific amounts of the polyisocyanate containing isocyanurate rings and ε-caprolactam are superior to the polyamide-imide soluble in cresol produced by using about an equivalent amount of ε-caprolactam to the total amount of isocyanate in heat resistance (heat softening temperature), flexibility (Erichsen test), and resistance to Freon. Therefore, the resin of this invention can be used as heat resistant coating compositions and varnishes for wire.

Further, the resin of this invention is also superior to tris(2-hydroxyethyl)isocyanurate modified polyester-imide widely used as enamel varnish of F class for wire (Comparative Example 2) in flexibility and resistance to Freon.

In the following Examples and Comparative Examples, insulated wires were produced under the following conditions.

Furnace: a vertical type furnace having a height of 4.5 m.
Furnace temperature: entrance/middle/exit=260° C./360° C./420° C. (Comparative Example 4: 300° C./350° C./400° C.)
Dice diameter (mm): 1.075×2, 1.100×2, 1.125×2, 1.150×2
Diameter of wire: 1.0 mm
Drawing speed: 6 to 8 m/sec (Comparative Example 4:9 to 13 m/sec.

COMPARATIVE EXAMPLE 3

Insulated wire was prepared by using the varnish produced in Comparative Example 1 (2).

COMPARATIVE EXAMPLE 4

Insulated wire was prepared by using tris(2-hydroxyethyl)isocyanurate modified polyester-imide varnish (trade name ISOMID, manufactured by Schenectady Chemicals Inc.).

EXAMPLE 4

| Ingredients | Grams | Equivalent |
|---|---|---|
| Polyisocyanate synthesized in Comparative Example 1 (1) (a 50% solution) | 26.8 | 0.08 |
| 4,4'-Diphenylmethane diisocyanate | 117.0 | 0.94 |
| Trimellitic anhydride | 96.0 | 1.00 |
| ε-Caprolactam | 39.4 | 0.70 |
| Cresol | 200 | |

The above-mentioned ingredients were reacted in the same manner as described in Comparative Example 1 (2) to give a varnish of resin concentration of 30% by weight adjusted with cresol. The resulting solution had a viscosity of 270 poises. The reduced viscosity ($\eta_{sp/c}$) measured in the same manner as described in Comparative Example 1 (2) was 0.21. Infrared spectra of the resin showed the absorption of imide group at 1780 cm$^{-1}$ and the absorption of amide group at 1650 cm$^{-1}$.

Insulated wire was prepared by using the thus produced varnish.

EXAMPLE 5

| Ingredients | Grams | Equivalent |
|---|---|---|
| Polyisocyanate synthesized in Comparative Example 1 (1) (a 50% solution) | 16.8 | 0.05 |
| 4,4'-Diphenylmethane diisocyanate | 118.8 | 0.95 |
| Trimellitic anhydride | 96.0 | 1.00 |
| ε-Caprolactam | 39.4 | 0.70 |
| Tin octoate | 0.1 | |
| Cresol | 225 | |

The above-mentioned ingredients were reacted in the same manner as described in Comparative Example 1 (2) to give a varnish of resin concentration of 30% by weight adjusted with cresol. The resulting solution had a viscosity of 280 poises. The reduced viscosity ($\eta_{sp/c}$) measured in the same manner as described in Comparative Example 1 (2) was 0.23. Infrared spectra of the resin showed the absorption of imide group at 1780 cm$^{-1}$ and the absorption of the amide group at 1650 cm$^{-1}$.

Insulated wire was prepared by using the thus produced varnish.

EXAMPLE 6

| Ingredients | Grams | Equivalent |
|---|---|---|
| Polyisocyanate synthesized in Comparative Example 1 (1) (a 50% solution) | 23.5 | 0.07 |
| 4,4'-Diphenylmethane diisocyanate | 105.8 | 0.85 |
| Trimellitic anhydride | 96.0 | 1.00 |
| ε-Caprolactam | 28.1 | 0.50 |
| Cobalt octoate | 0.5 | |
| Cresol | 200 | |

The above-mentioned ingredients were reacted in the same manner as described in Comparative Example 1 (2) to give a varnish of resin concentration of 30% by weight adjusted with cresol. The resulting solution had a viscosity of 310 poises. The reduced viscosity ($\eta_{sp/c}$) measured in the same manner as described in Comparative Example 1 (2) was 0.25. Infrared spectra of the resin showed the absorption of imide group at 1780 cm$^{-1}$ and the absorption of the amide group at 1650 cm$^{-1}$.

Insulated wire was prepared by using the thus produced varnish.

Properties of insulated wire thus produced were tested and the results were shown in Table 2.

TABLE 2

| Example No. | Flexibility | Heat softening temp. (load 2 kg) (°C.) | Thermal shock properties (240° C.- 2 hrs) | Wear resistance (times) | Resistance to Freon |
|---|---|---|---|---|---|
| Comparative Example 3 | 3X OK | 320 | 4X NG | 40 | △ |
| Comparative Example 4 | 2X OK | 380 | 3X OK | 22 | ◎ |
| Example 4 | 2X OK | 380 | 1X OK | 75 | ◎ |
| Example 5 | 2X OK | 380 | 1X OK | 80 | ◎ |
| Example 6 | 2X OK | 390 | 1X OK | 80 | ◎ |

Note
Properties were measured according to JIS 3003 except for resistance to Freon.

Resistance to Freon was tested as follows.

An insulated wire thus prepared was subjected to preliminary heating (at 120° C. for 1 hour) to remove water. Subsequently, the insulated wire and freezer oil (RM-25F) were placed in an autoclave and closed. The contents of the autoclave were heated to 100° C. while defoaming under reduced pressure (about 10 mm Hg). After maintaining at that temperature for 30 minutes, the autoclave was cooled to room temperature and Freon gas (R-22) was introduced in the autoclave in the same amount as the used freezer oil. The contents of the autoclave were heated to 125° C. and maintained at that temperature for 7 days to continue the treatment. Then the autoclave was cooled gradually to room temperature and the Freon gas was removed gently. Immediately after removing the Freon gas, the oil adhered to the sample was wiped off and the sample was subjected to heat treatment at 130° C. for 10 minutes. The thus treated insulated wire was subjected to various tests, i.e. observation of appearance, breakdown voltage and hardness, and these properties were judged totally by using marks ⊚ (good), o (slightly good) and Δ (defective).

As is clear from the results of Table 2, individual insulated wires obtained in Examples 4 to 6 by using varnishes produced from the specific polyisocyanate containing isocyanurate rings and ε-caprolactam in specified amounts are superior to insulated wire obtained in Comparative Example 3 by using the varnish produced from the polyamide-imide soluble in cresol produced by using about an equivalent amount of ε-caprolactam to the total amount of isocyanate in heat resistance (heat softening temperature), flexibility, wear resistance and resistance to Freon. Further, even comparing with insulated wire obtained by using the varnish of tris(2-hydroxyethyl)isocyanurate modified polyesterimide widely used as enamel varnish of F class (Comparative Example 4), the insulated wires of this invention are excellent in thermal shock properties, wear resistance and resistance to Freon.

What is claimed is:

1. A polyamide-imide resin obtained by reacting in a cresol type solvent a polyisocyanate containing isocyanurate rings, an aromatic diisocyanate, a lactam and a polycarboxylic acid containing at least one acid anhydride group at a temperature of 160° to 230° C., said polyisocyanate being used in an amount of 1 to 30 equivalent % based on the total isocyanate equivalent and said lactam being used in an amount of 20 to 80 equivalent % based on the total isocyanate equivalent; with the amounts of the isocyanate and the acid being 1.5 to 0.71/1 in terms of a ratio of the carboxyl group and the acid anhydride group to the isocyanate group.

2. A polyamide-imide resin according to claim 1, wherein the polyisocyanate containing isocyanurate rings is obtained by trimerization from 4,4'-diphenylmethane diisocyanate, 4,4'-diphenylether diisocyanate, tolylene diisocyanate or xylylene diisocyanate.

3. A polyamide-imide resin according to claim 1, wherein the aromatic diisocyanate is 4,4'-diphenylmethane diisocyanate, 4,4'-diphenylether diisocyanate, tolylene diisocyanate or xylylene diisocyanate.

4. A polyamide-imide resin according to claim 1, wherein the lactam is ε-caprolactam.

5. A polyamide-imide resin according to claim 1, wherein the polycarboxylic acid containing at least one acid anhydride group is a compound of the formula:

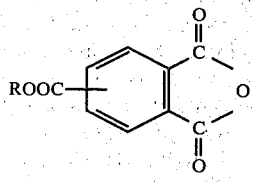

or

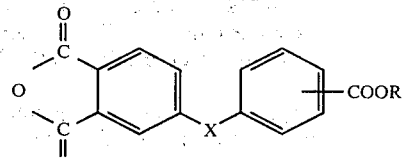

wherein R is hydrogen, alkyl or phenyl; and X is —CH$_2$—, —CO—, —SO$_2$— or —O—.

6. A polyamide-imide resin according to claim 1, wherein the cresol type solvent is cresol, phenol or xylenol.

7. A polyamide-imide resin according to claim 1 or 2, wherein the polyisocyanate containing isocyanurate rings contains remaining isocyanate groups in proportion of 10 to 70%.

8. A polyamide-imide resin according to claim 1, wherein the polyamide-imide resin is obtained by reacting in cresol a polyisocyanate containing isocyanurate rings prepared by trimerization from tolylene diisocyanate, 4,4'-diphenylmethane diisocyanate, ε-caprolactam and trimellitic anhydride, said polyisocyanate containing isocyanurate rings being used in an amount of 1 to 30 equivalent % based on the total isocyanate equivalent.

9. A process for producing a polyamide-imide resin which comprises reacting in a cresol type solvent a polyisocyanate containing isocyanurate rings, an aromatic diisocyanate, a lactam and a polycarboxylic acid containing at least one acid anhydride group at a temperature of 160° to 230° C., said polyisocyanate being used in an amount of 1 to 30 equivalent % based on the total isocyanate equivalent and said lactam being used in an amount of 20 to 80 equivalent % based on the total isocyanate equivalent; with the amounts of the isocyanate and the acid being 1.5 to 0.71/1 in terms of a ratio of the carboxyl group and the acid anhydride group to the isocyanate group.

10. A process according to claim 9, wherein the polyisocyanate containing isocyanurate rings, the aromatic diisocyanate and the lactam are reacted first in a cresol type solvent at a temperature of 160° to 190° C. and thereafter the polycarboxylic acid containing at least one acid anhydride group is added to the reaction system to continue the reaction at a temperature of 200° to 230° C.

11. A polyamide-imide resin composition containing the polyamide-imide resin of claim 1.

12. A polyamide-imide resin composition containing the polyamide-imide resin of claim 2, 3, 4 or 5.

13. A polyamide-imide resin composition containing the polyamide-imide resin of claim 8.

14. An electrical conductor having an insulating coating consisting essentially of the polyamide-imide resin of claim 1.

15. An electrical conductor having an insulating coating consisting essentially of the polyamide-imide resin of claim 8.

16. A polyamide-imide resin according to claim 2 or to claim 8 wherein the polyisocyanate containing isocyanurate rings is obtained by trimerization of the diisocyanate in a solvent which does not react with the isocyanate group and at a temperature of 50° to 160° C.

* * * * *